United States Patent [19]

Jardin et al.

[11] Patent Number: 4,476,085
[45] Date of Patent: Oct. 9, 1984

[54] STABILIZING WINDINGS FOR TILTING AND SHIFTING MODES

[75] Inventors: Stephen C. Jardin; Uffe R. Christensen, both of Princeton, N.J.

[73] Assignee: The United States of America as represented by the United States Department of Energy, Washington, D.C.

[21] Appl. No.: 352,745

[22] Filed: Feb. 26, 1982

[51] Int. Cl.³ .............................................. G21B 1/00
[52] U.S. Cl. ..................................... 376/137; 376/143
[58] Field of Search ............... 376/142, 133, 143, 137

[56] References Cited

U.S. PATENT DOCUMENTS 4,363,776 12/1982 Yamada et al. ..................... 376/133

OTHER PUBLICATIONS

Phys. Rec. Letters, 46, pp. 188–191, 1/19/81, Yamada et al.
LA-8700-C, Dec. 2–4, 1980.
Plasma Physics and Controlled Fusion Research, 1978, vol. III, 7th Conf. Proc., Innsbruck, Bussac et al., pp. 249–264.
"The S-1 Spheromak", 8/24/79.
"PPPL S-1 Spheromak Project", Eng. Handbook, 4/81.
Nuclear Fusion, vol. 21, 1981, pp. 1203–1207, Jardin et al.

*Primary Examiner*—Harvey E. Behrend
*Attorney, Agent, or Firm*—Bruce R. Mansfield; Paul A. Gottlieb; Michael F. Esposito

[57] ABSTRACT

This invention relates to passive conducting loops for stabilizing a plasma ring against unstable tilting and/or shifting modes. To this end, for example, plasma ring in a spheromak is stabilized by a set of four figure-8 shaped loops having one pair on one side of the plasma and one pair on the other side with each pair comprising two loops whose axes are transverse to each other.

9 Claims, 6 Drawing Figures

THE SPHEROMAK DEVICE

STABILIZING WINDINGS FOR TILTING AND SHIFTING MODES

The U.S. Government has rights in this invention under Contract DE-AC02-76CH03073 between the U.S. Department of Energy and Princeton University.

BACKGROUND OF THE INVENTION

This invention relates to self-assisting plasma rings. For purposes of this application, a self-assisting plasma ring is defined as an inductively formed, compact toroid containing a self-assisting, current carrying plasma. The current circulates around an annulus with a central X axis and Y and Z axes at right angles to each other and the X axis in a cartesian coordinate system.

Unlike the structure of a smoke ring, the self-assisting plasma rings of this invention, which are referred to hereinafter as "plasma rings" for ease of explanation, are substantially rigid due to the internal circulating electrical currents. To this end, the plasma ring contains internal, self-assisting currents $I_p$ that circulate in the plasma to sustain the ring along an endless axis in the ring mid-plane, which is normal to the X axis. Still further, the inductive formation of the plasma ring requires that it have externally produced equilibrium fields (EF).

Plasma rings have been known in the electrical arts in general, and the field of physics in particular since about the time that ball lighting, which contains self-assisting plasma currents, was first recognized as having distinctly rigid characteristics. U.S. patent application Ser. No. 283,823 filed Mar. 28, 1972, now abandoned, which is incorporated by reference herein, describes a plasma ring with self-assisting currents. Also, 46 Phys. Rev. Letters 188-91 describes the actual formation and use of plasma rings for transforming a gas into a substantially rigid, current carrying plasma ring in a spheromak.

Such substantially rigid, current carrying plasma rings can be inductively formed in a vacuum chamber in a spheromak. To this end, in one method, the plasma is formed around a toroidal flux core in the vacuum chamber. Then, the plasma contracts into a compact toroid that is held in equilibrium by the externally produced equilibrium fields (EF). However, the currents circulating in the plasma ring produce magnetic fields that interact with the equilibrium field, which may be steadystate, to produce unstable tilting and/or shifting modes. Such unstable tilting and/or shifting modes, are described in the "PS-1 Spheromak Experiment," by H. Bruhns, et al., and "Tilting-Mode-Stable Spheromak Configuration," by K. Yamazaki, in Los Alamos Scientific Laboratory Report LA-8700-C, pp 93-100, which are incorporated by reference herein.

One system for counteracting, eliminating or impeding one or more of these instabilities is to shape the outside of the plasma. To this end, for example, the plasma can be adiabatically compressed. One compression method is described for example, in U.S. Pat. No. 3,702,163. Another technique is to use active, multipole-field conductors on the inside of the vacuum chamber. However, these systems require, active conductors, power supplies, and complicated and expensive feedback controls.

These and other unique problems associated with plasma rings require that the desired stabilizing means be simple and inexpensive to build and operate. Also, the stabilizing means should not interfere unduly with the operation of the plasma rings or the access thereto, since an important advantage of plasma rings is that they provide the maximum self-assistance and freedom from external constraints. It is also advantageous that passive conductors be employed.

It is, accordingly, a general object of this invention to provide simple and inexpensive passive conducting means for stabilizing plasma rings having unstable tilting and/or shifting modes.

Another object of the invention is to provide passive conducting loops for stabilizing the tilting and/or shifting modes of plasma rings in a spheromak.

A still further object is to provide a passive method for stabilizing a plasma ring having externally produced equilibrium fields and internal plasma currents that interact to tilt and/or to shift the plasma ring.

The above and further novel features and objects of this invention will appear more fully from the following detailed description of one embodiment of this invention when the same is read in connection with the accompanying drawings, and the novel features will be particularly pointed out in the appended claims. It is to be expressly understood, however, that the drawings are not intended as a definition of the invention but are for purposes of illustration only.

SUMMARY OF THE INVENTION

This invention provides simple, inexpensive, independent and passive, conducting loops for stabilizing a plasma ring having externally produced equilibrium fields on opposite sides of the plasma ring and internal plasma currents that interact to tilt and/or shift the plasma ring relative to the externally produced equilibrium field so as to produce unstable tilting and/or shifting modes in the plasma ring. More particularly this invention provides first and second passive conducting loops for containing first and second induced currents in first and second directions corresponding to the amplitude and directions of the unstable tilting and/or shifting modes in the plasma ring. To this end, the induced currents provide additional magnetic fields for producing restoring forces and/or restoring torques for counteracting the tilting and/or shifting modes when the conducting loops are held fixed in stationary positions relative to the externally produced equilibrium fields on opposite sides of the plasma ring. In one embodiment, there are a total of four, independent, passive conducting loops. The loops form transverse figure-8 shaped conducting loops adjacent to the opposite sides of the plasma ring. With the proper selection of elements and their positioning, as described in more detail hereinafter, the desired stability is achieved.

BRIEF DESCRIPTION OF THE DRAWINGS

In the drawings where like elements are referenced alike.

DESCRIPTION OF THE PREFERRED EMBODIMENT

Figure 1:
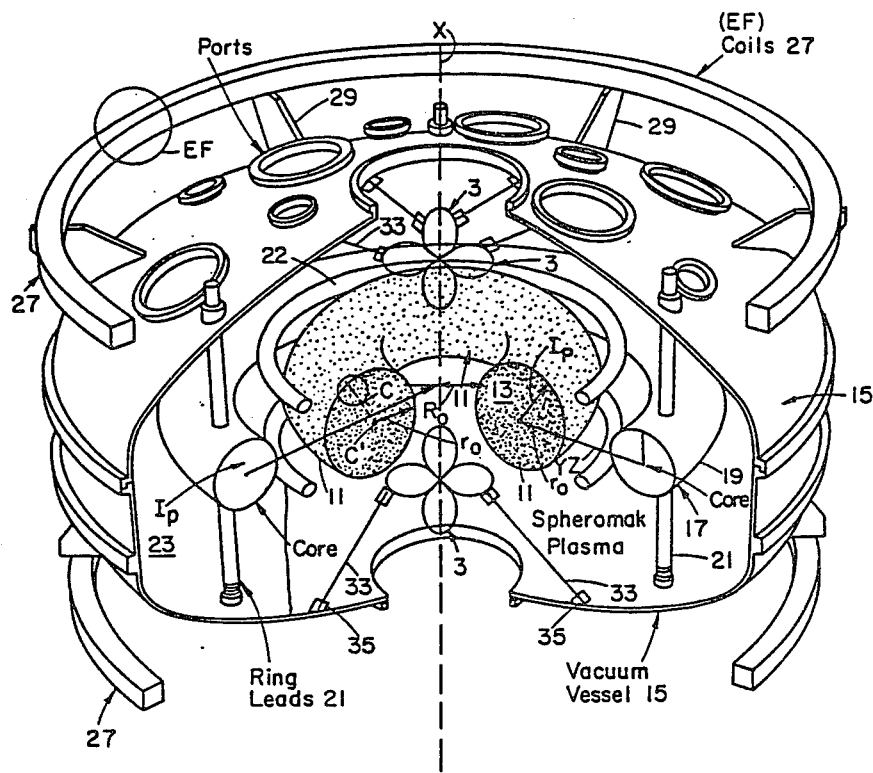
FIG. 1 is a partial cross-section of one embodiment of the apparatus of this invention for stabilizing a plasma ring in a spheromak, such as the ones that are described in 46 Phys. Rev. Letters 188-91 and/or in U.S. Pat. No. 4,363,776 by Furth et al., which are incorporated by reference herein.

This invention is useful in stabilizing a plasma ring against tilting and/or shifting modes. For purposes of this application, therefore, this invention is useful for producing plasma rings having the wide variety of applications to which stellarators, tokomaks, spherators, spheromaks, and other devices for producing plasma toroids have been applied. More particularly, however, this invention is useful in stabilizing the specific plasma rings produced in a spheromak of the proto-S-1 type for transforming one or more gases into a plasma of ions and electrons and stably confining the plasma away from material and/or the solid container walls of the vacuum container. The ions and electrons are thereby useful for a wide variety of uses, including research and development and/or the heating of elements in a gaseous state to a plasma thereby to transform the gas from one physical state to another. At high temperatures, such plasmas are useful for the heating of metals, the vaporization of solids, and/or the production of x-rays, light and/or nuclear transformations.

For purposes of this application, a spheromak is defined as a device for inductively forming a plasma ring of the type defined herein as having externally produced equilibrium fields on opposite sides of the plasma ring and internal plasma currents that interact to tilt and/or to shift the plasma ring relative to the externally produced equilibrium fields so as to produce unstable tilting and/or shifting modes in the plasma ring. The spheromak is also defined as being characterized by magnetic field lines that are closed (as in a tokomak) and by a coil-blanket topology that does not link the plasma (as in a mirror machine). The magnetic field configuration of the spheromak includes both toroidal and poloidal components, but the toroidal components are maintained entirely by internal plasma currents and, therefore, vanish outside the plasma. Spheromaks require no external toroidal field coils. The outward pressure of the toroidal field and of the plasma is balanced by the inward pressure of the poloidal pinch field. These characteristics are discussed further in 46 Phys. Rev. Letters 188 (Jan. 19, 1981), which is incorporated by reference herein.

The balancing of the inward and outward forces is somewhat analogous to the field produced by a beam of charged particles, like protons or electrons, traveling at the speed of light, since the inward force of this field exactly cancels the outward force produced by the repulsive charge of the particles themselves, as understood from U.S. Pat. No. 3,433,705 (claim 3) and U.S. Pat. No. 4,065,351, which are incorporated by reference herein.

In understanding this invention, it has been demonstrated both theoretically and experimentally that it is possible to form a spheromak plasma ring by inductively transferring both toroidal and poloidal currents from an axisymmetric toroidal flux core into the surrounding plasma. Once formed and separated from the toroidal flux core by an equilibrium field (EF), however, it is known that in the absence of nearby conductors or line tying effects, the plasma ring is unstable to a toroidal mode number n=1 with a tilt and/or shift polarity. This nearly rigid mode arises from the tendency of the plasma to tilt so as to align its magnetic moment with the externally produced equilibrium field or to shift horizontally (or vertically, depending on the orientation of the plasma ring) into a region of weaker magnetic field strength.

A systematic numerical stability study of this class of modes has shown that a spheromak plasma ring of circular cross section (b/a~1) and with aspect ratio R/a of greater than about 1.3 can be completely stabilized by a pair of horizontal conducting plates located within half a minor radius of the plasma edge. However, it is not possible for these horizontal stabilizing plates to exist in an inductively formed device since the same conductors that inhibit the instability would effectively shield the plasma from the flux core, thus short-circuiting the inductive formation process.

Figure 1A:
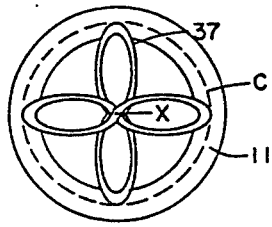
FIGS. 1a and 1b are partial three dimensional views of a set of passive conducting rings of FIG. 1 to show the relative size of the loops and the plasma ring axis.
Figure 1B:
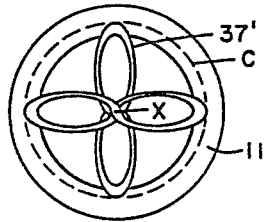

The solution to this dilemma is illustrated in FIG. 1, where we present four, passive, figure-8 shaped conductive loops 3. There are two, independent, figure-8 shaped, passive loops 3 on the top, oriented at right angles to one another, and two on the bottom, also oriented at right angles to each other. These passive loops 3 allow for the formation of n=1 induced currents that will act to stabilize the plasma against tilt/-shift modes but will not interfere with the plasma formation process. According to the relative sizes of the four loops 3 and the plasma ring 11 shown in FIGS. 1a and 1b, the loops 3 closely fit in a circle that corresponds to the endless axis C of the plasma ring 11. Thus, the loops 3 shown in FIGS. 1a and 1b are more to scale than the loops 3 of FIG. 1.

To make quantitative the effective stabilization of these loops 3, we take a simple model in which the spheromak plasma is represented by a rigid ring 11 of major radius $R_o$ carrying a current $I_p$. Let $B_z(R)$ be the external field required for equilibrium, with index $n_i = (-R_o/B_z)\partial B_z/\partial R | R_o$. When displaced to the side a distance d or tilted an angle $\theta$, the ring current interacting with the equilibrium field gradients will experience a force $(\partial F/\partial d)_e = \pi I_p B_z(R_o) n_i$ and a torque $(\partial N/\partial \theta)_e = -\pi r_o^2 I_p B_z(R_o) (1-n_i)$.

If the passive conducting loops are in place, they will provide a restoring force $(\partial F/\partial d)_c = I_p^2 (\partial L_{cp}/\partial d)^2/L_c$ and a restoring torque $(\partial N/\partial \theta)_c = I_p^2 (\partial L_{cp}/\partial \theta)^2/L_c$. Here $L_c$ is the effective self-inductance of the figure-8 coil system and $L_{cp}$ is the mutual inductance between the plasma ring 11 and the loops 3. The geometrical terms $(\partial L_{cp}/\partial d)^2/L_c$ and $(\partial L_{cp}/\partial \theta)^2/L_c$ are given in Tables I and II as functions of the vertical separation of the coils from the midplane YZ and the radius of one loop of the figure-8. These were computed for loops with a 2 cm radius in which the figure-8 geometry is made by joining two tangent circular coils. If the stabilizing forces of the loops 3 are greater in magnitude than the destabilizing forces due to the field gradients, the system will be stable to all rigid motions.

Thus, for example, a self-assisting plasma ring 11 centered at $R_o = 0.4$ m with current $I_p = 350$ KA in an external field of strength $B_z(R_o) = 0.15$ tesla with index $n_i = 0.9$ will have destabilizing forces due to the equilibrium fields of $(\partial f/\partial d)_e = 1.48 \times 10^5$ newtons/meter and $(\partial N/\partial \theta)_e = 2.64 \times 10^3$ newton-meters/radian. This will be stable to both the tilt and the shift mode by including a set of figure-8 loops 3 having vertical separation of 40 cm and lobes of radius 30 cm. This passively stabilized system would be expected to go unstable on the time scale $\tau_R \sim L_c/R$ where R is the resistance of the loops. An active feedback system would be necessary to obtain stabilization over a longer period.

Turning further to the drawings, initially to FIG. 1, a typical plasma ring 11 is shown that has externally produced equilibrium fields (EF) and internal plasma currents that interact to tilt and/or shift the plasma ring. Such plasma rings are shown and described in the above referenced publications and/or U.S. Pat. No. 4,363,776 by Yamada, Furth, Stix and Todd, and U.S. Pat. No. 4,436,691 by S. C. Jardin, H. D. Furth, M. Okabayashi and M. Yamada, which are incorporated by reference herein. For ease of explanation, the hereinafter described plasma ring 11 that is confined in the spheromak of the cited patent applications and/or the proto S-1 spheromak will be used to describe this invention, but it is understood that a wide variety of spheromaks and/or other such devices for producing plasma rings could be used. For example, the actual proto S-1 spheromak described in the following publications, which are incorporated by reference herein, could be used: 46 Phys. Rev. Letters No. 3, pp 188–191, Jan. 19, 1981; and LA-8700-C, Proceedings of the Third Symposium on the Physics and Technology of Compact Toroids for the Magnetic Fusion Energy Program, Los Alamos, N.M., Dec. 2-4, 1980.

In understanding the tilting and shifting instabilities of these plasma rings 11, in general and spheromaks in particular, it will be understood that the plasma ring 11 of FIG. 1, as defined above, contains an electrically conducting plasma 13 of ions and electrons. This ring 11 has an annulus with a central X axis. Also, the plasma ring 11 has a minor radius $r_o$ and a major radius $R_o$ in the mid-plane YZ of the plasma ring that is normal to the X axis. These plasma rings are usually formed by induction that produces internal self-assisting plasma currents $I_p$ that flow along the endless axis C of the plasma ring at the center C' of the minor radius $r_o$ of the plasma ring.

Figure 2:
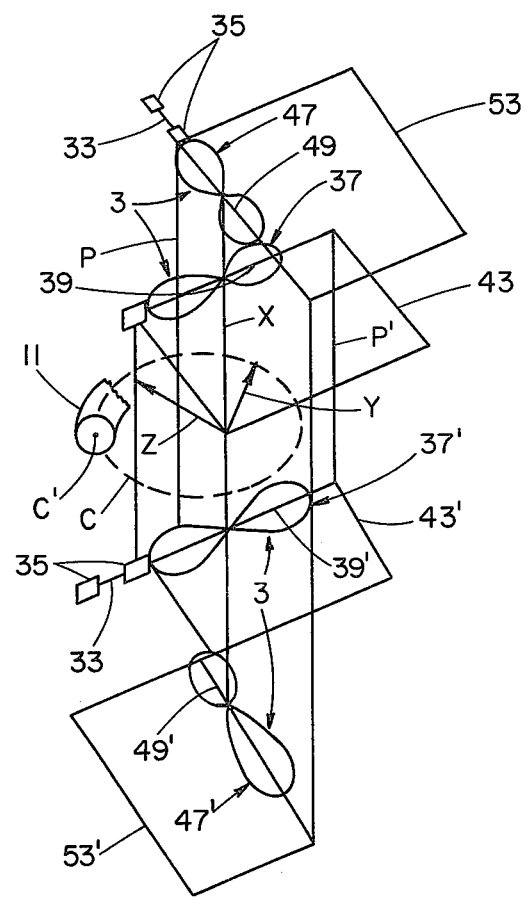
FIG. 2 is a schematic exploded view of the figure-8 shaped conducting loops of FIG. 1.

As shown in FIG. 2, the annulus has Y and Z axes at right angles to its X axis and to each other in a cartesian coordinate system. Since self sustaining plasma rings in general, and spheromaks in particular, have no external toroidal coils topologically linking the plasma 13, the plasma ring 11 is substantially free to tilt its X axis relative to the Y and Z axes in vacuum container 15. Thus, for example, the plasma ring 11 could tilt from the horizontal that is illustrated in FIG. 1, and/or shift its X axis from the center of vacuum container 15 along the Y or Z axis until the plasma ring 11 hits one or more solid elements 17, such as toroidal flux core 19, its supports 21, or coils 22. Obviously, this contact could cool the plasma 13 by transforming it back into a gas. Likewise, the solid elements could be heated or portions thereof could be vaporized in the vacuum 23 in container 15. Ordinarily, poloidal coils, such as equilibrium (EF) field coils 27 and their supports 29 on opposite sides of the plasma ring are outside of the outside wall of vacuum container 15. While they do not interact physically with the plasma the original equilibrium fields (EF) produced by coils 27 on opposite sides of the plasma ring 11 do interact with the internal plasma currents (and/or fields produced thereby) to produce the unstable tilting and/or shifting modes in plasma ring 11.

Rosenbluth and Bussac first pointed out the tilting-stability criterion for spheromaks in *Controlled Nuclear Fusion Research* (Proc. 7th Int. Conf., Insbruck, 1978, Vol. 3, IAEA Vienna (1979), p 249, which is incorporated by reference herein. This work has been extended by S. C. Jardin, M. S. Chance, R. L. Dewar, R. C. Grimm, and D. A. Monticello in Nuclear Fusion 21, 1203 (1981), which is also incorporated by reference herein. Actual tilting and/or shifting instabilities in the plasma ring produced in a spheromak have been reported in the "PS-1 Spheromak Experiment," on page 97 et seq of the above-cited LA-8700-C publication, which is incorporated by reference herein. The proto spheromak at Princeton U. is typical of this type of self-sustained plasma ring 11.

Should independent, passive, conducting loops 3 forming simple and inexpensive stabilizing loops of the correct shape be held stationary relative to uniform, stationary, externally produced equilibrium fields (EF) on the opposite sides of the plasma ring 11 by braces 33 so that the loops are insulated from each other and from the container by insulators 35, as shown in FIGS. 1 and 2, the tilting and/or shifting modes of the plasma will be impeded or entirely eliminated without unduly interfering with the plasma during its formation. To this end, as shown schematically and not to scale in FIG. 2, for example, the passive, conducting loops 3 comprise first passive, conducting loops 37 and 37' having a first set of spaced-apart, parallel equilibrium axes 39 and 39' in parallel first planes 43 and 43' on opposite sides of the plasma ring 11. Second, passive conducting loops 47 and 47' have a second set of spaced-apart, parallel equilibrium axes 49 and 49' corresponding to axes 39 and 39', but transverse thereto. These axes 49 and 49' are in second planes 53 and 53' that are parallel to each other and the first planes.

The braces 33 hold the conducting loops 37 and 37' and 47 and 47' fixed in stationary positions relative to the original equilibrium field (EF) on opposite sides of the plasma 13 so that the above-mentioned two sets of axes are in planes P and P' that are normal to each other. These latter planes P and P' intersect such that their intersection corresponds to the untilted and/or unshifted X axis. Thus the figure-8's on each side of the plasma are generally transverse to each other. Stated another way, the first and second figure-8's are disposed so that the projections of their two sets of axes on a single plane from their parallel planes 43, 43', 53, and 53' are at right angles to each other. Thus, the adjacent figure-8 loops on each side of the plasma are generally transverse or perpendicular to each other when viewed in the top view of FIG. 3 relative to the equilibrium fields (EF).

Figure 3:
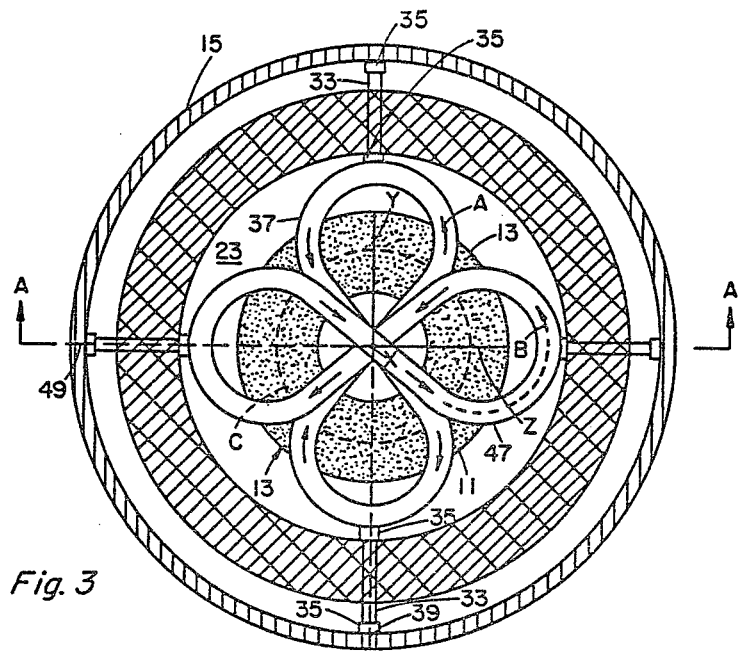
FIG. 3 is a partial top view of the apparatus of FIG. 1.
Figure 4:
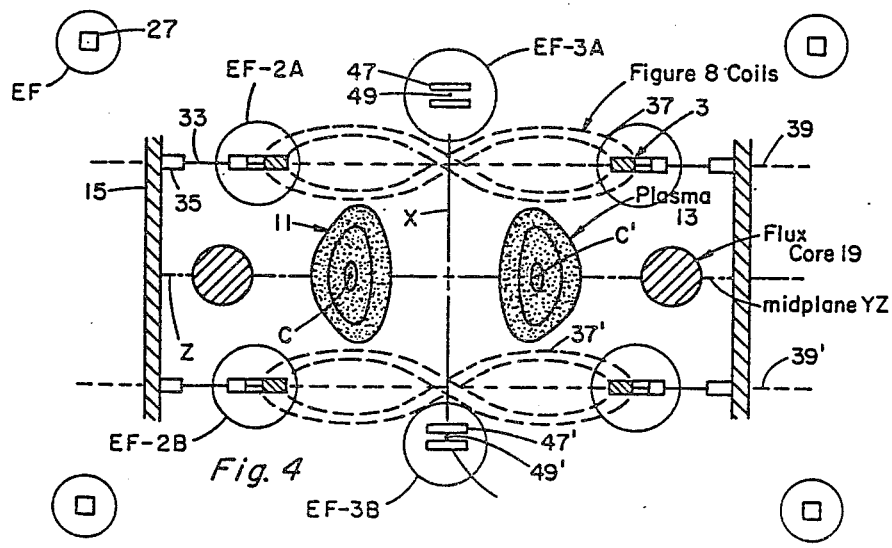
FIG. 4 is a partial cross-section of the apparatus of FIG. 3 through A—A. at a slightly different time from the time of FIG. 1.

If, due to an instability in the plasma, the X axis of the plasma ring 11 tilts or shifts along the Y axis relative to the externally produced equilibrium fields (EF) this produces endless induced currents in a first direction A in the first passive conducting loop 37 as shown in FIG. 3 along with another magnetic field (EF-2A), as shown in FIG. 4. A like current is induced in conducting loop 37' along with a corresponding magnetic field (EF-2B). These currents produce magnetic fields which produce restoring torques and/or restoring forces including fields having equilibrium field gradients for impeding, counteracting and/or eliminating the undesired tilting and/or shifting modes.

Likewise, if the X axis of the plasma ring tilts and/or shifts along the Z axis relative to the externally produced equilibrium field (EF) this produces endless induced currents in a second direction B in the second passive conducting loop 47, as shown in FIG. 3, along with still another magnetic field (EF-3A), as shown in FIG. 4. A like current is also induced in passive conducting loop 47', along with still another corresponding magnetic field (EF-3B). These currents produce restoring torques and/or restoring forces that are additional to the original equilibrium fields (EF), for impeding, counteracting and/or eliminating these unstable tilting and/or shifting modes.

These additional magnetic fields correspond in direction and amplitude to the direction and amplitude of the tilting or shifting. Thus, if the X axis tilts and/or shifts between the Y and the Z axis with vectors along both the Z and Y axis, this produces endless induced currents in both first and second passive conducting loops 37, 37', 47 and 47' proportional to the direction and amplitude of the vectors. The total effect, therefore, is to provide additional magnetic fields that produce restoring forces and/or restoring torques that impede, counteract and/or eliminate the unstable tilting and/or shifting modes when said conducting loops are held fixed in stationary positions on opposite sides of the plasma ring. Thus, the plasma ring is maintained for a time long enough so as to insure the stability of the plasma ring against hitting any solid objects in container 15.

In the preferred embodiment shown in FIGS. 1, 2, 3 and 4, the equilibrium fields (EF) are shaped with indexes to minimize the shifting of the X axis, as described in more detail hereinafter. Also, rigid braces 33 hold the figure-8 shaped, passive, conducting loops 3 stationary, stable and rigidly in place relative to the equilibrium field (EF) with sufficient strength to counteract any tilting and/or shifting of the X axis relative to the Y and Z axes. To this end, for example the braces 33 have rigid insulators 35. Thus, the passive, conducting loops, which comprise hollow copper tubing, are insulated from the container 15 and from the loops 37, 37', 47 and 47' by the rigid insulators 35 to keep the endless induced currents in the outside skin of the passive conducting loops 31 from shorting out of the desired paths in the loops or into the container 15. Other materials, however, may alternately be used alone or as a coating on copper, such as silver, gold, aluminum or equally low resistance alloys for the tubing.

The formation of the induced currents in loops of copper, which has a low resistivity and long time constant, acts to stabilize the plasma against the undesirable tilting and/or shifting modes of the plasma ring 11 for up to about 0.1 second or more. This is all that is required, since the plasma is formed in a much shorter time than 0.1 sec. Also, these induced currents generate restoring magnetic forces whose strengths increase as the square of the plasma currents.

Advantageously, the plasma formation process does not cause induced currents in the figure-8 shaped loops, whereas the tilting and/or shifting of the plasma does. To this end, the indirect current flows are in identical, transversely disposed, endless, figure-8 shaped loops having symmetrical equilibrium axes 39, 39', 47 and 47' in spaced-apart, parallel and symmetrical planes, such as those illustrated in FIG. 2. In the embodiment of FIGS. 3 and 4, the axes closest to the midplane of the plasma ring are equally spaced from the midplane up to about a minor radius $r_o$ or more from the edge of the plasma ring. Also, the adjacent loops 3 on each side of plasma ring are insulated by vacuum gaps. Alternately, the loops are insulated from each other by solid magnetically permeable insulation.

As shown in FIGS. 3 and 4, the figure-8 shaped loops have identical quasi-circular lobes with space between the crossing points of the figure-8's so that the crossings don't touch each other. This spacing at the crossing points prevents shorting of the loops. Alternately, solid insulation may be used to this end. The result is that each figure-8 shaped loop is insulated to provide specific, independent and endless induced currents in response only to the tilting and/or shifting of the X axis relative to the Y and Z axes.

Each figure-8 shaped loop has two quasi-circular lobes having uniformly gentle tapers that criss-cross with each other into and out of the plane of the equilibrium axis of the respective figure-8 shaped loops. This has the effect that each figure-8 shaped coil is completely symmetrical with respect to, but transverse to, its neighboring loop so that the loops present a balanced geometry to the toroidal flux core 19. Thus, currents in the flux core don't produce induced currents in the figure-8 shaped loops. On the other hand, the tilting or shifting of the X axis relative to the Y and Z axes causes induced currents in the passive conducting loops 3.

In review of this important feature of this invention, it will be understood that the plasma ring 11 can be inductively formed by pulses of current in a conventional toroidal flux core 19 without causing any induced currents in the passive, conducting loops 3. However, such induced currents do appear when the plasma ring tilts or shifts its X axis relative to the Y and Z axes. This is because the figure-8 shaped loops are electrically floating; that is, they are insulated from each other and the vacuum container. Also, the toroidal flux core is not inductively linked to the figure-8 shaped loops because the figure-8 geometry is balanced to currents in either direction that can be induced by the toroidal flux ring. However, each figure-8 is unbalanced to current production induced by the tilting or shifting of the X axis along the Y or Z axis respectively.

In one example of one actual embodiment at Princeton University, each quasi-circular lobe of each figure-8 shaped loop has a radius of 30 cm and the loops closest to the plasma have a spacing from the plasma ring of 0.25 meters. The sizes of each figure-8 are equal. They are rigidly held for stabilizing a plasma ring of circular cross-section and an aspect ratio of major to minor radii $R_o/r_o = 1.33$. In this example, the plasma ring has a major radius $R_o = 0.4$ meters, a minor radius $r_o = 0.3$ meters and self-assisting plasma currents $I_p = 350$ KA in external equilibrium fields (EF) of strength $B_z(r_o) = 0.15$ tesla.

Advantageously, these latter fields have indexes of curvature $n_i = 0.9$ for substantially eliminating any shifting of the X axis relative to the Y and Z axes. However, if the passive, conducting loops are in place, they will provide a restoring force generated by the eddy currents $(\partial F/\partial d)_c = I_p^2 (\partial L_{cp}/\partial d)^2 L_c$ and a restoring torque $(\partial N/\partial \theta)_c = I_p^2 (\partial L_{cp}/\partial \theta)^2 L_c$.

In operation, this invention advantageously has four, independent, passive conducting loops, each with a figure-8 topology for stabilizing a plasma ring in a spheromak to the rigid body toroidal mode number n=1 for tilting and/or shifting modes. The inclusion of these loops does not interfere with the inductive formation process of the plasma ring, since the coils are insulated from each other by vacuum gaps and/or by solid insulation and from the container by insulators 35. This operation is described in more detail in a paper entitled "Stabilizing Windings for the Tilting and Shifting Modes in an Inductively Formed Spheromak," by S. C. Jardin and U. Christensen, Princeton University Report PPPL-1814, which is incorporated by reference herein.

Advantageously, the figure-8 shaped loops of this invention are used with the proto-S-1 or the S-1 spheromak in either a horizontal or a vertical configuration. The S-1 spheromak is a compact vertical torus currently under construction at the Princeton Plasma Physics Laboratory and scheduled for completion in late 1982. This spheromak is described in the "PPPL S-1 Spheromak Project, Engineering Handbook, Revision 1 April 1981," and "The S-1 Spheromak, A Proposal," dated Aug. 24, 1979, which are incorporated by reference herein. The spheromak coil system consist of a toroidal flux core of 1 m major radius, located within the vacuum vessel, and three pairs of equilibrium field (EF) coils located outside the vessel. The toroidal flux core 19 induces the currents $I_p$ within the plasma. The windings, which accomplish this function, are made of water-cooled copper cables located in grooves (not shown) in and around an epoxy-glass torus form, which provides support for the cables against the magnetic loads. Also located within the toroidal flux core 19 are several turns to minimize interception of the equilibrium field (EF) fluxes by the core 19. The entire assembly of the toroidal flux core 19 is enclosed in an aluminum shell, broken in both the poloidal and toroidal direction, to reduce the toroidal field (TF) ripple and to act as a stabilizer. The entire winding and shell assembly are sealed within a thin-walled metallic vacuum liner.

The equilibrium field (EF) system is constructed of conventional water-cooled extruded hollow copper conductors insulated with mylar and glass epoxy. Existing Princeton Large Torus (PLT/PDX) motor-generator sets are used for power. The system is designed to permit powering of various portions of the equilibrium field (EF) system so that the field curvature can be varied to study its effect on the plasma stability. Also, the equilibrium field (EF) system can change the geometry of the plasma cross-section with time.

The formation of the plasma ring in a spheromak, is also described in more detail in the above-cited paper and co-pending applications which are assigned to the assignee of this application. While the plasma ring ordinarily has a round cross section, as in FIG. 1, it can also have a non-circular cross-section, as in FIG. 4. To this end, the plasma cross-section may be changed with time.

While copper tubing is preferred for the passive conductive loops, many other conductive metals could be used. To this end, the metal should have a low enough resistivity to provide the desired time constant of about 0.1 second or more and the plasma ring should be formed in less than a 0.1 sec., by conventional means, such as the spheromaks described above. If aluminum is used, the aluminum tubing can be insulated with solid $Al_2O_3$, which is added to the outside thereof by conventional anodizing means well known in the art.

This invention has the advantage of stabilizing inductively formed plasma rings having externally produced equilibrium fields and internal currents that interact to tilt and/or shift the plasma relative to the equilibrium fields. Such plasma rings are produced in spheromaks, which are in use and/or are being built at Princeton University and elsewhere. This invention has the advantage of stabilizing the tilting and/or shifting instabilities of these plasma rings without interfering with their inductive formation process. This may be the only way to provide gross stability to the plasma ring in a spheromak. Thus, if spheromaks gain wide spread commercial use, so too will this invention, since such widespread commercial use may depend on the use of this invention. In this connection, this invention has the novel feature that the described passive conducting loops have figure-8 topology. They also do not couple inductively with the toroidal flux core for producing the plasma ring in a spheromak. They do, however, have a strong inductive coupling with the axisymmetric motions of the plasma ring in a spheromak and/or other such means for producing the same.

TABLE I

| Values of the geometrical parameter $(\partial L_{cp}/\partial d)^2/L_c$ for a 3 cm radius conductor. | | | | |
|---|---|---|---|---|
| a = | | 0.2 | 0.3 | 0.4 * |
| | 0.4 | 6.8 | 23.4 | 30 |
| z | 0.3 | 17 | 64 | 72 × 10$^{-8}$ |
| | 0.2 | 352 | 176 | 168 |
| | 0.1 | 29.2 | 500 | 362 |

*Numbers on top refer to various values of the lobe radius for a plasma with major radius $R_o = 0.4$ m.

TABLE II

| Values of the geometrical paramater $(\partial L_{cp}/\partial \theta)^2/L_c$ for a 2.5 cm radius conductor. | | | | | |
|---|---|---|---|---|---|
| a = | | 0.2 | 0.3 | 0.4 | 0.5 * |
| | 0.3 | 1.5 | 0.56 | 0.014 | 0.38 |
| z | 0.2 | 9.1 | 3.2 | 0.046 | 0.22 × 10$^{-8}$ |
| | 0.1 | 64 | 13 | 0.90 | 0.002 |

*Numbers on top refer to various values of the lobe radius a for a plasma with major radius $R_o = 0.4$ m.

What is claimed is:

1. In an inductively formed plasma ring system, a plasma ring being capable of tilting and shifting and having a major axis, externally produced equilibrium fields on opposite sides of the plasma ring, and internal plasma currents that interact so as to cause at least one of said tilting and said shifting of the plasma ring relative to the externally produced equilibrium fields so as to produce at least one of said unstable tilting and said shifting modes in the plasma ring, a stabilizing means for said plasma ring;

the improvement in said stabilizing means comprising:
a. first, passive, conducting loops in magnetic communication with said modes so as to have produced therein, in response to at least one of said tilting and said shifting modes of said plasma ring first endless induced currents traveling in a first direction corresponding to the direction of first ones of said tilting and said shifting modes of the plasma ring;

said endless induced currents providing additional magnetic fields that produce restoring forces for impeding at least one of said first tilting and said first shifting modes when said first, passive, conducting loops are held fixed in a stationary position relative to the externally produced equilibrium fields on opposite sides of said plasma ring;

b. second, passive, conducting loops transverse to said first, passive, conducting loops in magnetic communication with said modes so as to have produced therein, in response to at least one of said tilting and said shifting modes of said plasma ring, second endless induced currents traveling in a second direction corresponding to the direction of second ones of said unstable tilting and said shifting modes of the plasma ring;

said first and said second conducting loops forming figure-8 shaped loops having axes that are transverse to each other and positioned along the major axis of said plasma ring, on opposite sides thereof; said induced currents providing still additional magnetic fields that produce restoring forces for counteracting ones of said second tilting and said second shifting modes when said second, passive, conducting loops are held fixed in a stationary position relative to the externally produced equilibrium fields on opposite sides of said plasma ring; and c. means for holding the first and second passive conducting loops fixed in stationary positions relative to said externally produced equilibrium fields on opposite sides of said plasma ring for causing said first and second induced currents to counteract at least one of said tilting and said shifting modes of the plasma ring.

2. The stabilizing means of claim 1 in which said first and second passive conducting loops are electrically insulated from each other and other structures.

3. The stabilizing means of claim 2 in which the figure-8 shaped loops are made from low resistance conductors having time constants that allow for the formation of induced skin currents that act to stabilize the plasma against at least one of said tilting and said shifting modes of the plasma ring for up to about 0.1 seconds or more.

4. The stabilizing means of claim 3 in which the figure-8 shaped loops have two quasi-circular lobes having uniformly gentle tapers that criss-cross and are insulated from with each other along the respective axes of said figure-8 shaped loops.

5. The stabilizing means of claim 4 in which said figure-8 shaped loops are located up to about a half a minor radius $r_o$ or more from the edge of the plasma ring.

6. The stabilizing means of claim 5 in which said figure-8 shaped loops are formed from hollow metal tubing for providing induced currents in the skin of the tubing.

7. The stabilizing means of claim 6 in which the first and second passive conducting loops are first and second figure-8 shaped loops that carry first and second currents respectively in response to at least one of said tilting and said shifting of the plasma ring from a central axis through its annulus in first and second directions, said induced currents generating magnetic fields that produce a force that suppresses at least one of said shifting and said tilting modes.

8. The stabilizing means of claim 7 in which each lobe of each figure-8 shaped coil has a radius of about 30 cm, and the loops closest to the mid-plane of the plasma ring are spaced from the ring for stabilizing a plasma ring of circular cross section.

9. Method for stabilizing a plasma ring having a major axis and being capable of tilting and shifting, against at least one of said shifting and said tilting modes, comprising the steps of:

a. inductively forming a plasma ring having at least one of said unstable tilting and said shifting modes due to said forming step;

b. producing induced currents in passive conductive means which comprise first and second conducting figure-8 shaped loops having axes that are transverse to each other and fixedly positioned in stationary positions along the major axis of said plasma ring on opposite sides thereof, in response to at least one of said unstable tilting and said shifting modes; and c. using said induced currents to stabilize at least one of said shifting and said tilting of said plasma ring without interfering with the inductive forming step, said induced currents producing fields for overcoming at least one of said tilting and said shifting that is caused in said plasma ring by the inductive forming step.

* * * * *